(12) United States Patent
Hsu (10) Patent No.: US 9,066,260 B2
(45) Date of Patent: Jun. 23, 2015

(54) SYSTEM, SERVER AND METHOD FOR CALCULATING DATA VOLUME OF NETWORK ACCESS

(71) Applicant: Industrial Technology Research Institute, Hsinchu (TW)

(72) Inventor: Yu-Ching Hsu, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 104 days.

(21) Appl. No.: 14/056,955

(22) Filed: Oct. 18, 2013

(65) Prior Publication Data

US 2014/0119218 A1 May 1, 2014

Related U.S. Application Data

(60) Provisional application No. 61/721,438, filed on Nov. 1, 2012.

(30) Foreign Application Priority Data

Aug. 19, 2013 (TW) .............................. 102129673 A (51) Int. Cl.
*H04L 12/26* (2006.01)
*H04W 4/00* (2009.01)
(Continued)

(52) U.S. Cl.
CPC ................ *H04W 24/08* (2013.01); *H04W 4/24* (2013.01); *H04L 12/1435* (2013.01); *H04L 12/4633* (2013.01)

(58) Field of Classification Search
CPC ... H04L 12/14; H04L 12/189; H04L 12/1403; H04L 12/6418; H04L 29/06319; H04L 29/12367; H04L 45/74; H04L 61/2015; H04L 61/2514; H04L 63/08; H04L 63/0892; H04L 65/105; H04L 65/1046; H04L 65/1066; H04L 65/1083; H04L 67/14; H04L 67/18; H04L 67/306; H04W 4/02; H04W 4/24; H04W 8/06; H04W 8/26; H04W 12/06; H04W 24/08; H04W 36/0016; H04W 36/0038; H04W 36/22; H04W 40/24; H04W 60/00; H04W 88/08; H04W 88/16; H04M 15/00; H04M 15/41; H04M 15/66; H04M 15/80; H04M 2215/0164; H04M 2215/14; H04M 2215/204
USPC ......... 370/229–240, 252, 310–350, 400–402, 370/474–475

See application file for complete search history.

(56) References Cited

U.S. PATENT DOCUMENTS

| 6,879,574 B2 | 4/2005 | Naghian et al. |
| 7,649,872 B2 | 1/2010 | Naghian et al. |

(Continued)

FOREIGN PATENT DOCUMENTS

| CN | 102711164 | 10/2012 |
| WO | 2013000645 | 1/2013 |

OTHER PUBLICATIONS

King and Smith, "Dynamic Addressing and Mobility in Tactical Hybrid Ad-hoc Networks", IEEE MILCOM 2005, Oct. 17-20, 2005, pp. 1-6.

(Continued)

*Primary Examiner* — Tri H Phan
(74) *Attorney, Agent, or Firm* — Jianq Chyun IP Office (57) ABSTRACT

A calculating system is provided, which includes at least one eNB and a core network. The eNB is coupled to two mobile devices. The core network includes two servers. The first mobile device operates as a mobile access point for the second mobile device to access a computer network via the eNB and the core network. The eNB and the core network provide a charging data record (CDR) of access of the computer network of one of the two mobile devices to the second server. The first server provides separation information indicating binding relationship between a network address of the second mobile device and the other one of the two mobile devices. The second server calculates data volumes of the access of the computer network of the two mobile devices separately according to the CDR and the separation information. The second server may further bill the two mobile devices separately.

35 Claims, 10 Drawing Sheets

(51) Int. Cl.
  *H04L 12/28* (2006.01)
  *H04W 24/08* (2009.01)
  *H04W 4/24* (2009.01)
  *H04L 12/14* (2006.01)
  *H04L 12/46* (2006.01)

(56) References Cited

U.S. PATENT DOCUMENTS

| | | | |
|---|---|---|---|
| 8,085,758 B2 * | 12/2011 | Ramachandran et al. | 370/352 |
| 8,144,728 B2 * | 3/2012 | Ahmavaara | 370/466 |
| 8,229,440 B2 | 7/2012 | Yoon et al. | |
| 8,627,416 B2 * | 1/2014 | Keeler et al. | 726/4 |
| 8,639,248 B2 * | 1/2014 | Giustina et al. | 455/436 |
| 8,688,551 B2 * | 4/2014 | Belling et al. | 705/34 |
| 8,897,183 B2 * | 11/2014 | Andreasen et al. | 370/310 |
| 2005/0153725 A1 | 7/2005 | Naghian et al. | |
| 2007/0121540 A1 | 5/2007 | Sharp et al. | |
| 2012/0011365 A1 | 1/2012 | Schmidt et al. | |
| 2012/0260320 A1 | 10/2012 | Keeler et al. | |

OTHER PUBLICATIONS

Jarvinen et al., "MICS Messaging Platform: Architecture, Design and Routing", IEEE MILCOM 2010, Oct. 31-Nov. 3, 2010.

Fleischman and Furmanski, "Mobile Exterior Gateway Protocol: Extending IP Scalability", IEEE MILCOM 2005, Oct. 17-20, 2005, pp. 1-7.

Tang and Poyhonen, "Dynamic Interface and Address Grouping," IEEE WoWMoM, Jun. 18-21, 2007.

Hei and Song, "Stochastic Relay Routing in Peer-to-Peer Networks", IEEE ICC, Jun. 2006, pp. 1065-1070.

Ozugur and Sarikaya, "Combining Layer 2-Layer 3 Paging for Wireless LANs", IEEE ToWC, Sep. 2006, vol. 5, No. 9.

* cited by examiner

SYSTEM, SERVER AND METHOD FOR CALCULATING DATA VOLUME OF NETWORK ACCESS

CROSS-REFERENCE TO RELATED APPLICATION

This application claims the priority benefits of U.S. provisional application Ser. No. 61/721,438, filed on Nov. 1, 2012 and Taiwan application serial no. 102129673, filed on Aug. 19, 2013. The entirety of each of the above-mentioned patent applications is hereby incorporated by reference herein and made a part of this specification.

BACKGROUND

1. Technical Field

This disclosure relates to a system, a server, and a method for calculating data volume of network access.

2. Description of Related Art

WiFi has become one of the mainstreams in terms of wireless local network communication. At present, there are many types of mobile devices, such as smart phones and tablet computers, having capacity for WiFi connection. However, WiFi network construction is mostly restricted to the urban areas. In remote outdoor areas, mobile devices with only WiFi connection capacity are unable to access the network.

A dual mode mobile device, which has both WiFi connectivity and 3GPP (3rd Generation Partnership Project) connectivity, can be used as a mobile access point (M-AP) to allow other mobile devices that have only WiFi connectivity to access the network.

SUMMARY

This disclosure provides a system, a method, and an authentication server for calculating data volume of network access.

In an exemplary embodiment of the disclosure, a calculating system for calculating data volume of network access is provided, which includes at least one eNB and a core network. The at least one eNB is coupled to a first mobile device and a second mobile device. The core network is coupled to the at least one eNB and a computer network, and includes a first server and a second server. The first mobile device operates as a mobile access point for the second mobile device to access the computer network via the at least one eNB and the core network. The at least one eNB and the core network provide a charging data record (CDR) of access of the computer network of one of the first and second mobile devices to the second server. The first server provides separation information to the second server, wherein the separation information indicates a binding relationship between a network address of the second mobile device and the other one of the first and second mobile devices. The second server calculates data volumes of the access of the computer network of the first and second mobile devices separately according to the CDR and the separation information.

In an exemplary embodiment of the disclosure, an authentication server includes a communication interface and a processor. The communication interface is configured to communicate with a first mobile device and a second mobile device. The first mobile device operates as a mobile access point for the second mobile device to access a computer network via at least one eNB, a core network, and the authentication server. The processor of the authentication server is coupled to the communication interface, and performs a registration and authentication procedure via the first mobile device with the second mobile device and acquires binding information according to the registration and authentication procedure. The binding information indicates a binding relationship between the second mobile device and the first mobile device. The processor generates a charging data record (CDR) of access of the computer network of the first and second mobile devices and calculates data volumes of the access of the computer network of the first and second mobile devices separately according to the CDR and the binding information.

In an exemplary embodiment of the disclosure, a calculating method for calculating data volume of network access includes the following steps: providing a charging data record (CDR) of access of a computer network of one of a first mobile device and a second mobile device, wherein the first mobile device operates as a mobile access point for the second mobile device to access the computer network via at least one eNB and a core network; providing separation information indicating a binding relationship between a network address of the second mobile device and the other one of the first and second mobile devices; and separately calculating data volumes of the access of the computer network of the first and second mobile devices according to the CDR and the separation information.

In another exemplary embodiment of the disclosure, a calculating method for calculating data volume of network access is executed by an authentication server and includes the following steps: performing a registration and authentication procedure via a first mobile device with a second mobile device, wherein the first mobile device operates as a mobile access point for the second mobile device to access a computer network via at least one eNB and a core network; acquiring binding information according to the registration and authentication procedure, wherein the binding information indicates a binding relationship between the second mobile device and the first mobile device; generating a charging data record (CDR) of access of the computer network of the first and second mobile devices; and separately calculating data volumes of the access of the computer network of the first and second mobile devices according to the CDR and the binding information.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
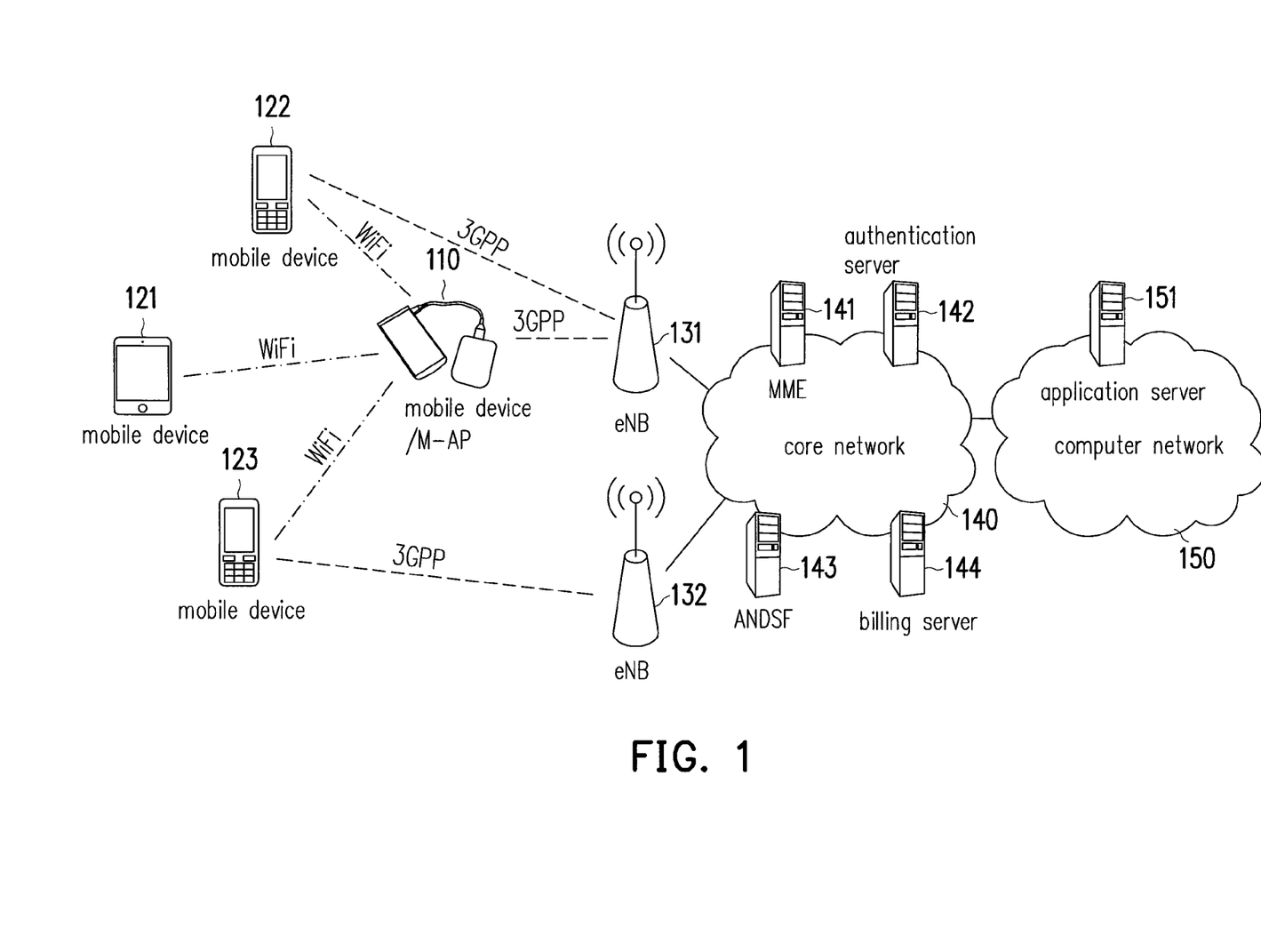
FIG. 1 is a schematic view of a calculating system for calculating data volume of network access according to an embodiment of the disclosure.

FIG. 1 is a schematic view of a calculating system for calculating data volume of network access according to an embodiment of the disclosure. In FIG. 1, a mobile access point 110 is also a mobile device. Mobile devices 121-123 and the mobile access point 110 can be smart phones, personal digital assistants (PDA), tablet computers, or laptop computers, etc. The mobile access point 110 is coupled to the mobile devices 121-123. An eNB 131 is coupled to the mobile device 122 and the mobile access point 110. An eNB 132 is coupled to the mobile device 123. A core network 140 is coupled to the eNBs 131 and 132. The core network 140 is a part of a telecommunication system that conforms to the 3GPP standard or the Long Term Evolution (LTE) standard. The core network 140 can include a Mobility Management Entity (MME) 141, an authentication server 142, an Access Network Discovery and Selection Function Server (ANDSF) 143, and a billing server 144. A computer network 150 is coupled to the core network 140 and includes an application server 151. The computer network 150 can connect multiple computers and network devices. For example, the Internet may serve as the computer network 150. The calculating system for calculating data volume of network access in this embodiment includes the core network 140 and at least one eNB (131 and/or 132).

Figure 2:
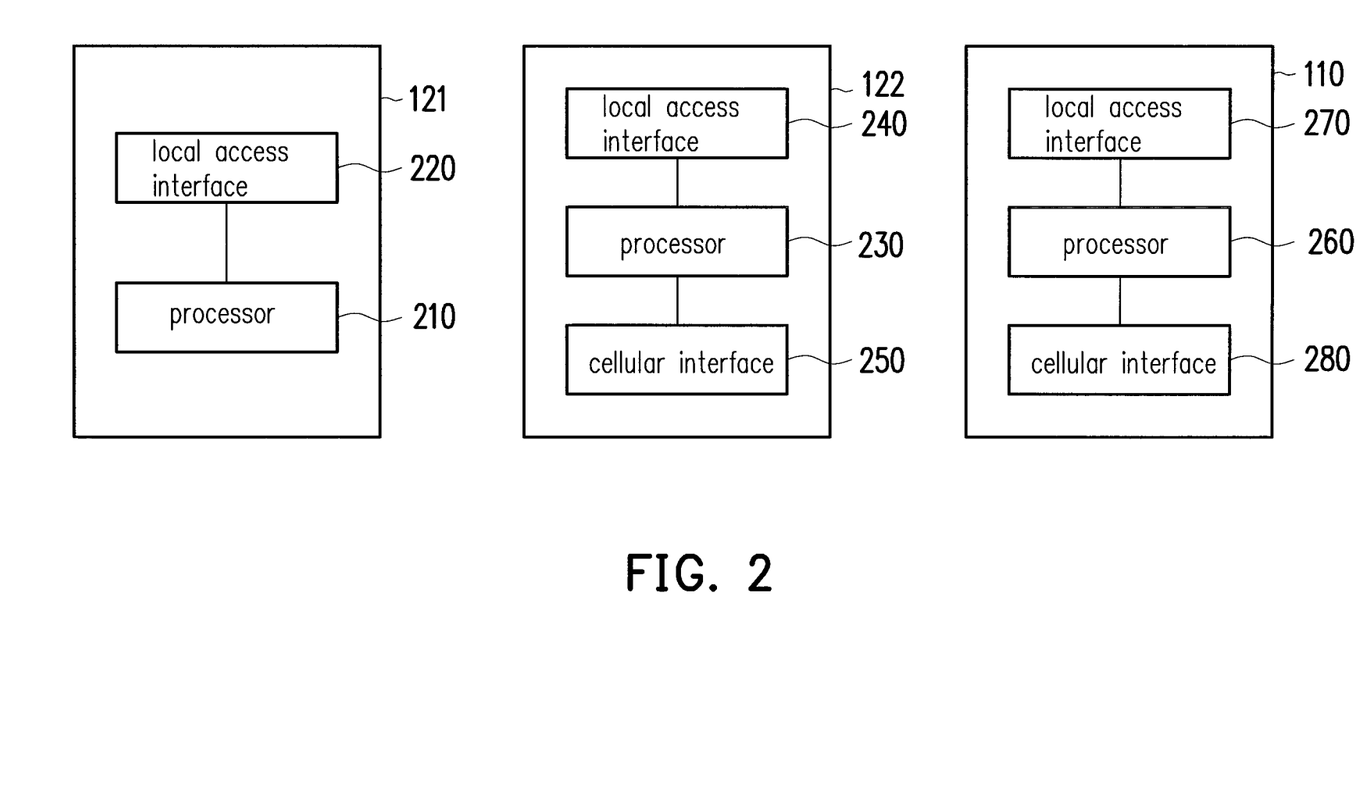
FIG. 2 is a schematic view of mobile devices and a mobile access point according to an embodiment of the disclosure.

The mobile device 110 serves as a mobile access point, which allows the mobile devices 121-123 to access the computer network 150 (to access the application server 151 in the computer network 150, for example) through at least one eNB (131 and/or 132) and the core network 140. FIG. 2 is a schematic view of the mobile devices 121-123 and the mobile access point 110 according to an embodiment of the disclosure.

Figure 3:
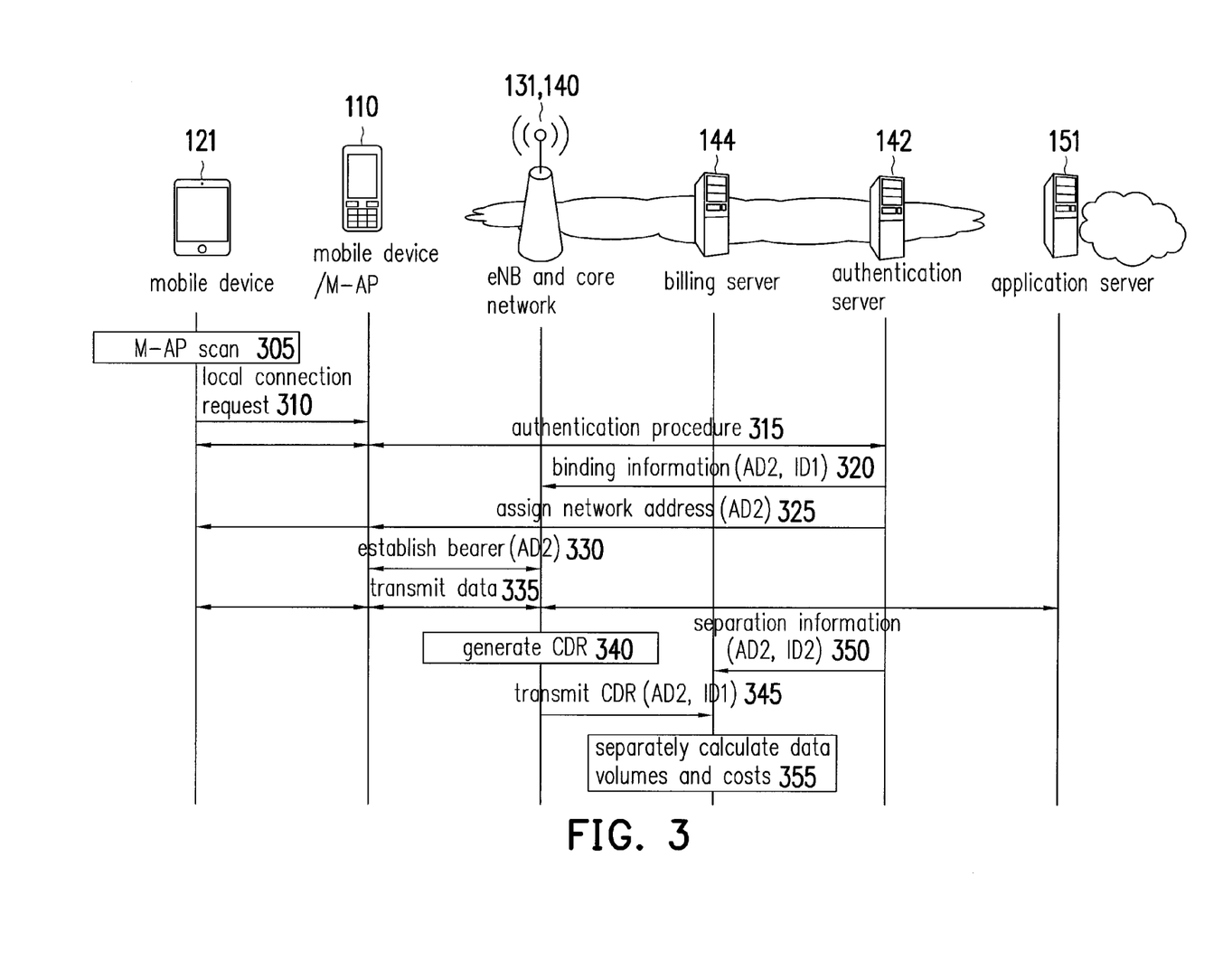
FIGS. 3-9 are flowcharts illustrating calculating methods for calculating data volume of network access according to several embodiments of the disclosure.

The mobile device 121 includes a processor 210 and a local access interface 220. The local access interface 220 is configured to communicate with the mobile access point 110. The processor 210 controls an operation of the mobile device 121. For example, the steps executed by the mobile device 121 in FIG. 3 are performed under control of the processor 210.

The mobile device 122 includes a processor 230, a local access interface 240, and a cellular interface 250. The local access interface 240 is configured to communicate with the mobile access point 110, and the cellular interface 250 is configured to communicate with the eNB 131. The processor 230 controls an operation of the mobile device 122. For example, the steps executed by the mobile device 122 in FIGS. 5-8 are performed under control of the processor 230. The mobile device 123 has the same inner structure as the mobile device 122.

The mobile access point 110 includes a processor 260, a local access interface 270, and a cellular interface 280. The local access interface 270 is configured to communicate with the mobile devices 121-123, and the cellular interface 280 is configured to communicate with the eNB 131. The processor 260 controls an operation of the mobile access point 110. For example, the steps executed by the mobile access point 110 in FIGS. 4-8 are performed under control of the processor 260.

In FIG. 1, the mobile access point 110 and the mobile devices 121-123 communicate with each other via a WiFi interface, but this embodiment is not limited to using WiFi communication technology. The local access interface of the mobile access point 110 and the mobile devices 121-123 can use any type of local wireless communication technology to perform communication, such as wireless local area network (WLAN), Bluetooth, Direct WiFi, or LTE D2D. In FIG. 1, the mobile access point 110 and the mobile devices 122-123 communicate with the eNBs 131 and 132 and the core network 140 via a 3GPP interface, but this embodiment is not limited to using the 3GPP standard. The cellular interface of the mobile access point 110 and the mobile devices 122-123 can use any type of wireless telecommunication technology to communicate with the eNBs 131 and 132 and the core network 140, such as the 3GPP standard or LTE standard.

The mobile devices 121-123 respectively represent three types of application situations. The mobile device 121 represents a first application situation, in which the mobile device that includes no cellular interface spontaneously searches for the mobile access point 110 to access the computer network 150. FIG. 3 illustrates a procedure of the aforementioned first application situation. The mobile devices 122 and 123 respectively represent the second and third application situations, in which a dual mode mobile device with the local access interface and the cellular interface searches for the mobile access point 110 to access the computer network 150 with help of the core network 140. FIGS. 4-8 illustrate procedures of the aforementioned second and third application situations. A difference between the second and third application situations is that, in the second application situation, the mobile device 122 and the mobile access point 110 are connected to the same eNB 131, while in the third application situation, the mobile device 123 and the mobile access point 110 are connected to different eNBs 131 and 132.

FIG. 3 is a flowchart illustrating a calculating method for calculating data volume of network access according to an embodiment of the disclosure. The flowchart of FIG. 3 shows the aforementioned first application situation, wherein the mobile device 121 accesses the application server 151 in the computer network 150 via the mobile access point 110. In Step 305, the mobile device 121 finds the mobile access point 110 by an M-AP scan. For example, if the mobile device 121 and the mobile access point 110 both have capacity for WiFi connection, the mobile device 121 can utilize a WiFi access point scan to find the mobile access point 110. Then, in Step 310, the mobile device 121 sends a local connection request so as to be connected to the mobile access point 110. Thereafter, in Step S315, the authentication server 142 and the mobile device 121 perform an authentication procedure via the mobile access point 110. A user of the mobile device 121 can establish an account in the authentication server 142 in advance for carrying out the authentication procedure of Step 315. Alternatively, the user of the mobile device 121 can establish the account during the authentication procedure of Step 315.

The authentication server 142 can acquire binding information of the mobile device 121 and the mobile access point 110 by the authentication procedure of Step 315. The binding information indicates that the mobile device 121 will access the computer network 150 via the mobile access point 110. The authentication server 142 can decide a network address AD2, by which the mobile device 121 accesses the computer network 150. In Step 320, the authentication server 142 can provides the binding information to the MME 141 of the core network 140, wherein the binding information indicates a binding relationship between the network address AD2 of the mobile device 121 and an identification code ID1 of the mobile access point 110. In addition, the binding information can further include a user profile of the mobile device 121. The authentication server 142 can assign the network address AD2 to the mobile device 121 in Step 325. Step 320 and Step 325 are exchangeable in sequence.

Next, in Step 330, the mobile access point 110 sends a request to the MME 141 to establish a bearer for the mobile device 121. The bearer is exclusive resources that the core network 140 assigns for connecting the mobile device 121 and the computer network 150. The request for establishing the bearer includes the network address AD2 of the mobile device 121. Since the MME 141 has received the binding information in Step 320 and accepts that the AD2 is the network address of the mobile device 121, the MME 141 can receive the request for establishing the bearer for the mobile device 121 according to the binding information. According to the 3GPP standard, the bearer is called a packet data protocol context, i.e. PDP context. According to the LTE standard, the bearer is called an evolved packet system bearer, i.e. EPS bearer.

Then, in Step 335, the mobile device 121 transmits data via the mobile access point 110, the eNB 131, the core network 140, and the application server 151. In Step 340, the eNB 131 and the core network 140 generate a charging data record (CDR) of the access of the computer network 150 of the mobile access point 110. In Step 345, the eNB 131 and the core network 140 provide the CDR to the billing server 144.

The application server 151 may refer to any server in the computer network 150. The eNB 131 and the core network 140 measure and calculate data volumes of the access of the computer network 150 of the mobile device 121 and the mobile access point 110 together as the data volumes of the mobile access point 110. Therefore, the CDR includes the network address AD2 of the mobile device 121, the identification code ID1 of the mobile access point 110, and the data volume and the time duration of the access of the computer network 150 of the mobile device 121 and the mobile access point 110.

In Step 350, the authentication server 142 provides separation information to the billing server 144. The separation information indicates a binding relationship between the network address AD2 of the mobile device 121 and the mobile device 121, and includes the network address AD2 and an identification code ID2 of the mobile device 121. In Step 355, the billing server 144 can separately calculate data volumes of network access of the mobile access point 110 and the mobile device 121 according to the CDR of Step 345 and the separation information of Step 350, that is, to separately calculate the data volumes of the access of the computer network 150 of the mobile access point 110 and the mobile device 121 in Step 335. In Step 335, the data is packaged as a network packet for transmission. In Step 355, the billing server 144 can further bill the mobile access point 110 and the mobile device 121 separately according to the CDR and the separation information, that is, to separately calculate the costs incurred by the access of the computer network 150 of the mobile access point 110 and the mobile device 121. Accordingly, the billing server 144 can accurately calculate the costs of the access of the computer network 150 of the mobile device 121 to bill the user of the mobile device 121, and the billing server 144 can also accurately accumulate a service provision volume of the mobile access point 110. In the embodiment of FIG. 3, Step 350 can be performed in any sequence between Step 315 and Step 355.

Figure 4:
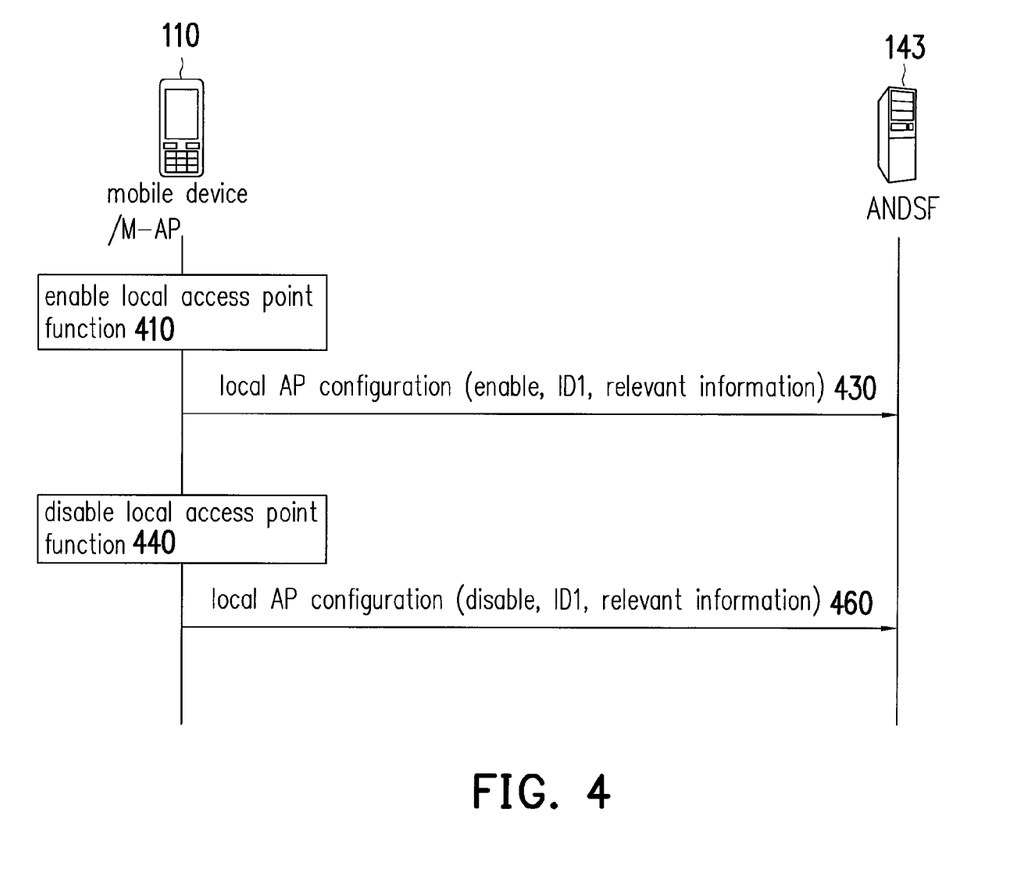

FIG. 4 is a flowchart illustrating a calculating method for calculating data volume of network access according to another embodiment of the disclosure. FIG. 4 illustrates a first procedure of the second and third application situations. In the second and third application situations, the ANDSF 143 maintains an M-AP list and assists the mobile device 122 or 123 to search for or select the mobile access point according to the M-AP list. The M-AP list records local network information and position information of each mobile access point. For example, the M-AP list can store the information in the format of a form, in which each record corresponds to one mobile access point, and each record can include columns for the identification code, local network information, and position information, etc., of the corresponding mobile access point. The local network information can be information, such as a local network identification code, address, supported version, etc. The position information can be position coordinates of the mobile access point, such as Global Positioning System (GPS) coordinates or identification code of the eNB that serves the corresponding mobile access point.

FIG. 4 illustrates a procedure, by which the ANDSF 143 maintains the M-AP list. When the user enables a local access point function of the mobile access point 110 in Step 410, or when the local access point function has been enabled but the local network information or the position information needs to be updated, the mobile access point 110 transmits a local AP configuration to the ANDSF 143 in Step 430. The local AP configuration can include the identification code ID1 of the mobile access point 110, a notification of enabling of the local access point function, and other relevant information, such as the local network information and the position information required by the M-AP list. The ANDSF 143 then adds one record corresponding to the mobile access point 110 or updates the original record in the M-AP list according to the local AP configuration.

When the user disables the local access point function of the mobile access point 110 in Step 440, the mobile access point 110 transmits the corresponding local AP configuration to the ANDSF 143 in Step 460. The local AP configuration can include the identification code ID1 of the mobile access point 110, a notification of disabling of the local access point function, and the aforementioned relevant information. Then, the ANDSF 143 deletes the record corresponding to the mobile access point 110 from the M-AP list according to the local AF configuration.

Figure 5:
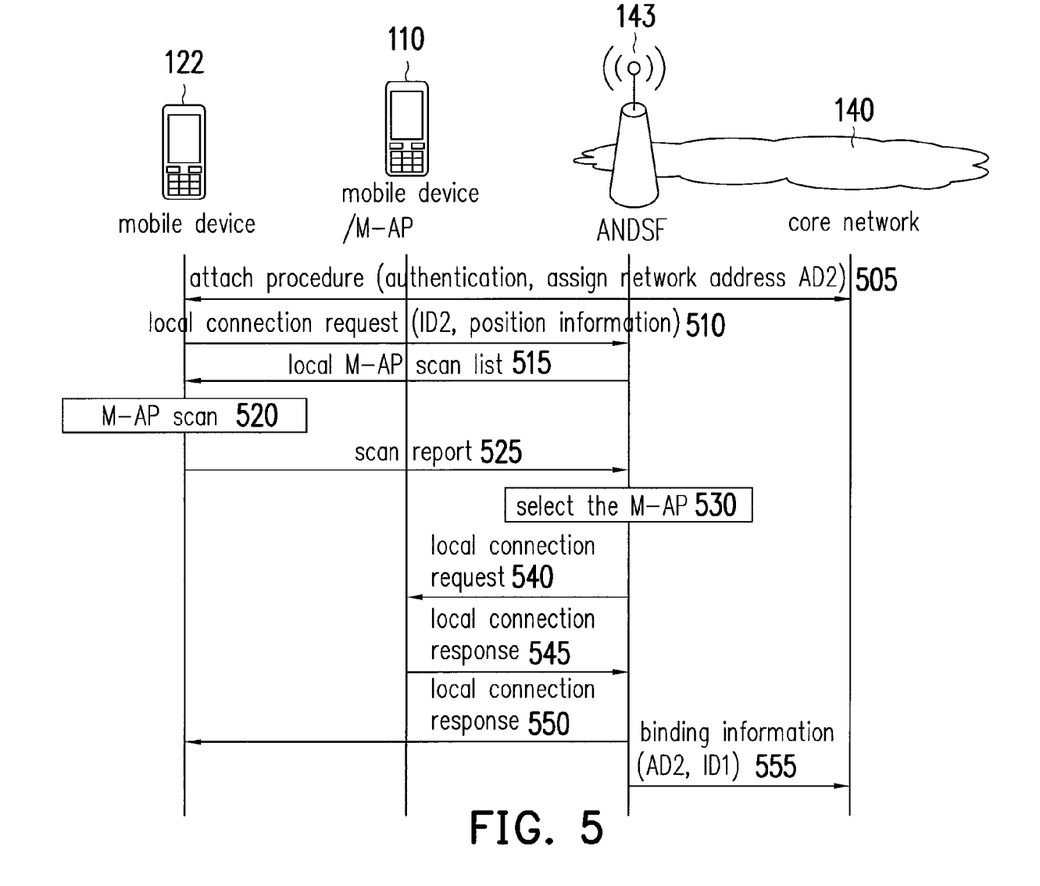

FIG. 5 is a flowchart illustrating a calculating method for calculating data volume of network access according to an embodiment of the disclosure. FIG. 5 illustrates a second procedure of the second and third application situations, in which the mobile device 122 searches for the mobile access point 110 with help of the ANDSF 143, so as to access the computer network 150. The mobile device 122 is given as an example in FIGS. 5-8, but it should be noted that the mobile devices 122 and 123 are exchangeable.

In Step 505, the mobile device 122 performs an attach procedure with the core network 140. In the attach procedure, the core network 140 completes the authentication of the mobile device 122 and assigns the network address AD2 to the mobile device 122. In Step 510, the mobile device 122 sends a local connection request to the ANDSF 143, and the local connection request includes the identification code ID2 and position information of the mobile device 122. In Step 515, the ANDSF 143 provides a local M-AP scan list to the mobile device 122 according to the position information provided by the mobile device 122. The ANDSF 143 can check the mobile access points in the M-AP list maintained by the ANDSF 143 and select one mobile access point or more, which is suitable for the mobile device 122, according to factors, such as the position and loading of each mobile access point, and then the ANDSF 143 adds the identification codes of the access points to the local M-AP scan list of Step 515 to notify the mobile device 122.

In Step 520, the mobile device 122 scans each mobile access point in the local M-AP scan list. The mobile device 122 can judge by itself which one (or ones) of the mobile access points is suitable according to a scan result, and generate a scan report from the scan result of the suitable mobile access point. Then, in Step 525, the scan report is sent to the ANDSF 143. The scan report can include the network address AD2 of the mobile device 122 and the scan result of one (or ones) of the mobile access points in the local M-AP scan list.

For example, the scan result can include a signal strength of each mobile access point received by the mobile device 122.

After receiving the scan report, the ANDSF 143 selects one of the mobile access points in the scan report as the mobile access point 110 in Step 530. For example, the ANDSF 143 can select the mobile access point according to factors such as the signal strength, position, and loading, etc. Thereafter, in Step 540, the ANDSF 143 sends the local connection request to the mobile access point 110 for the mobile device 122. This request message contains the address AD2 of the mobile device 122. If the mobile access point 110 accepts this request, a local connection response is sent to the mobile device 122 via the ANDSF 143 in Steps 545 and 550. In Step 555, the ANDSF 143 provides the binding information to the MME 141 of the core network 140, wherein the binding information indicates a binding relationship between the identification code ID2 or network address AD2 of the mobile device 122 and the identification code ID1 of the mobile access point 110.

Figure 6:
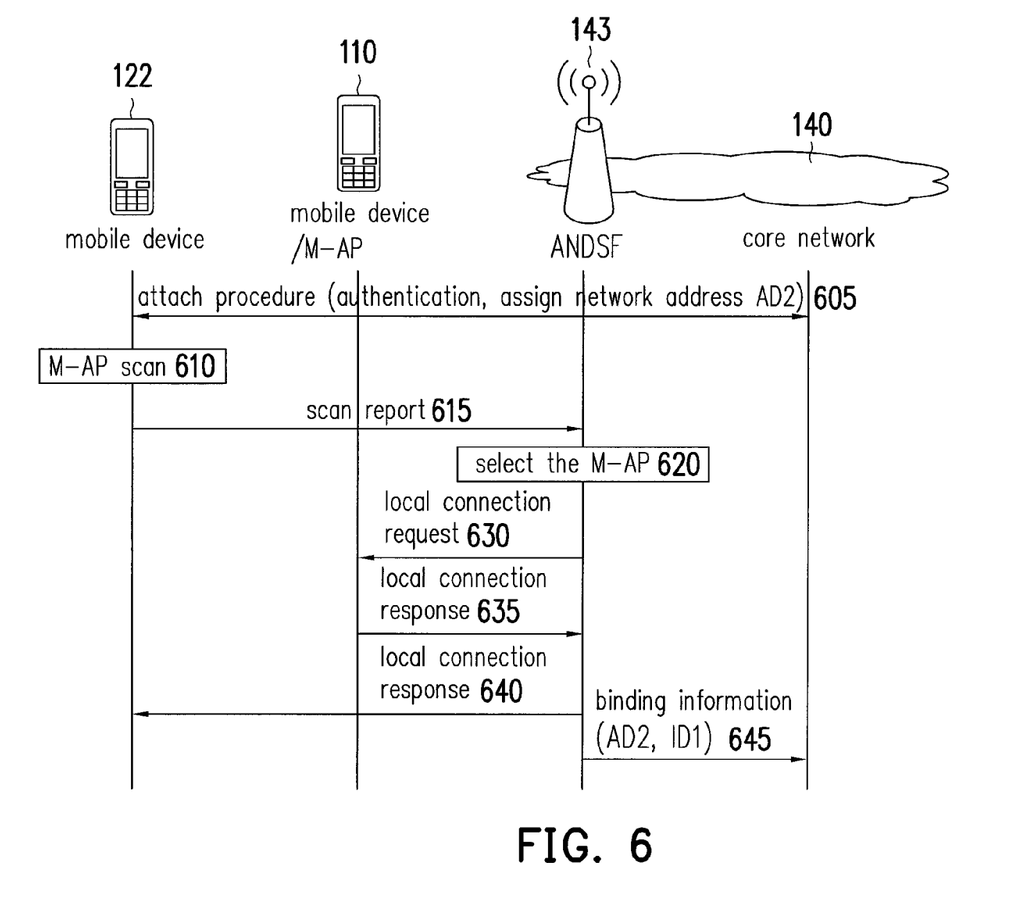

FIG. 6 illustrates a variation of the procedure of FIG. 5. Step 605 of FIG. 6 is the same as Step 505 of FIG. 5 and thus will not be described again hereinafter. Then, the mobile device 122 performs the M-AP scan in Step 610 and provides the scan report to the ANDSF 143 in Step 615. The scan report includes a scan result of the mobile device 122 scanning at least one nearby mobile access point. The mobile device 122 can judge by itself which one (or ones) of the mobile access points is suitable according to the scan result, and generate the scan report from the scan result of the suitable mobile access point. For example, the scan result can include the signal strength of each mobile access point received by the mobile device 122.

The ANDSF 143 selects one of the mobile access points in the scan report as the mobile access point 110 in Step 620. For example, the ANDSF 143 can select the mobile access point according to factors such as the signal strength, position, and loading, etc. Thereafter, in Step 630, the ANDSF 143 sends the local connection request to the mobile access point 110 for the mobile device 122. Steps 630-645 of FIG. 6 are the same as Steps 540-555 of FIG. 5 and thus will not be described again hereinafter.

Figure 7:
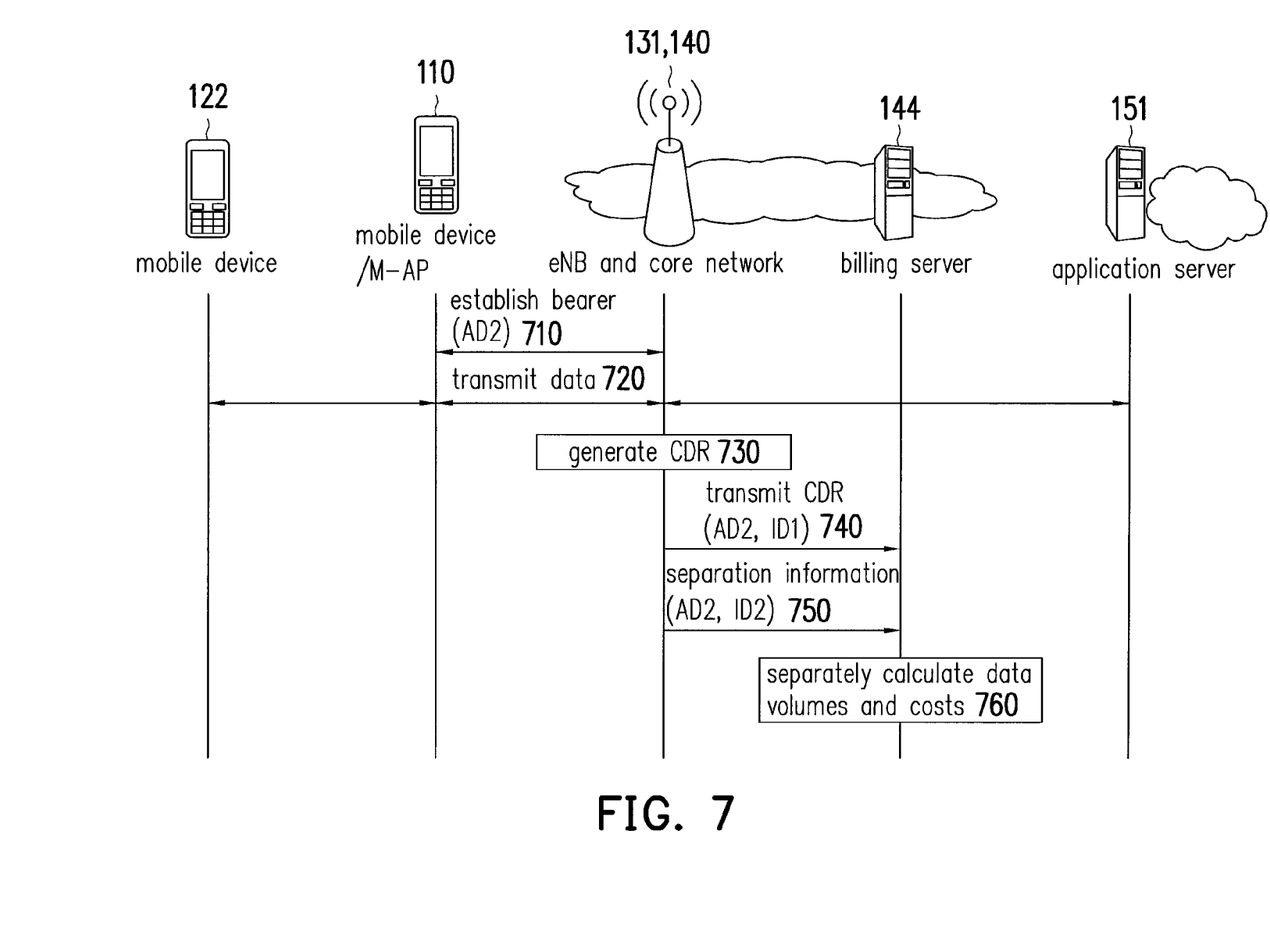

FIG. 7 is a flowchart illustrating a calculating method for calculating data volume of network access according to an embodiment of the disclosure. FIG. 7 illustrates a last procedure of the second and third application situations. First, in Step 710, the mobile access point 110 sends a request to the MME 141 of the core network 140 to establish a bearer for the mobile device 122. The request for establishing the bearer includes the network address AD2 of the mobile device 122. Since the MME 141 has received the binding information in the procedure of FIG. 5 or FIG. 6 and accepts that the AD2 is the network address of the mobile device 122, the MME 141 can accept the request according to the binding information.

Then, in Step 720, the mobile device 122 transmits data via the mobile access point 110, the eNB 131, the core network 140, and the application server 151. In Step 730, the eNB 131 and the core network 140 generate a charging data record (CDR) of the access of the computer network 150 of the mobile access point 110. In Step 740, the eNB 131 and the core network 140 provide the CDR to the billing server 144.

In the embodiment of FIG. 7, the eNB 131 and the core network 140 bind the data volume of the access of the computer network 150 of the mobile device 122 to the mobile access point 110. Therefore, the CDR includes the network address AD2 of the mobile device 122, the identification code ID1 of the mobile access point 110, and the data volume and the time duration of the access of the computer network 150 of the mobile device 122 via the mobile access point 110.

In Step 750, the ANDSF 143 provides the separation information to the billing server 144. The separation information indicates the binding relationship between the network address AD2 of the mobile device 122 and the mobile device 122, and includes the network address AD2 and an identification code ID2 of the mobile device 122. In Step 760, the billing server 144 can separately calculate data volumes and costs for the mobile access point 110 and the mobile device 122 according to the CDR and the separation information, that is, to separately calculate the data volumes of the access of the computer network 150 of the mobile access point 110 and the mobile device 122 and calculate the costs incurred by the access of the computer network 150 of the mobile access point 110 and the mobile device 122. Accordingly, the billing server 144 can accurately calculate the costs of the access of the computer network 150 of the mobile device 122 to bill the user of the mobile device 122, and the billing server 144 can also accurately accumulate the service provision volume of the mobile access point 110.

Figure 8:
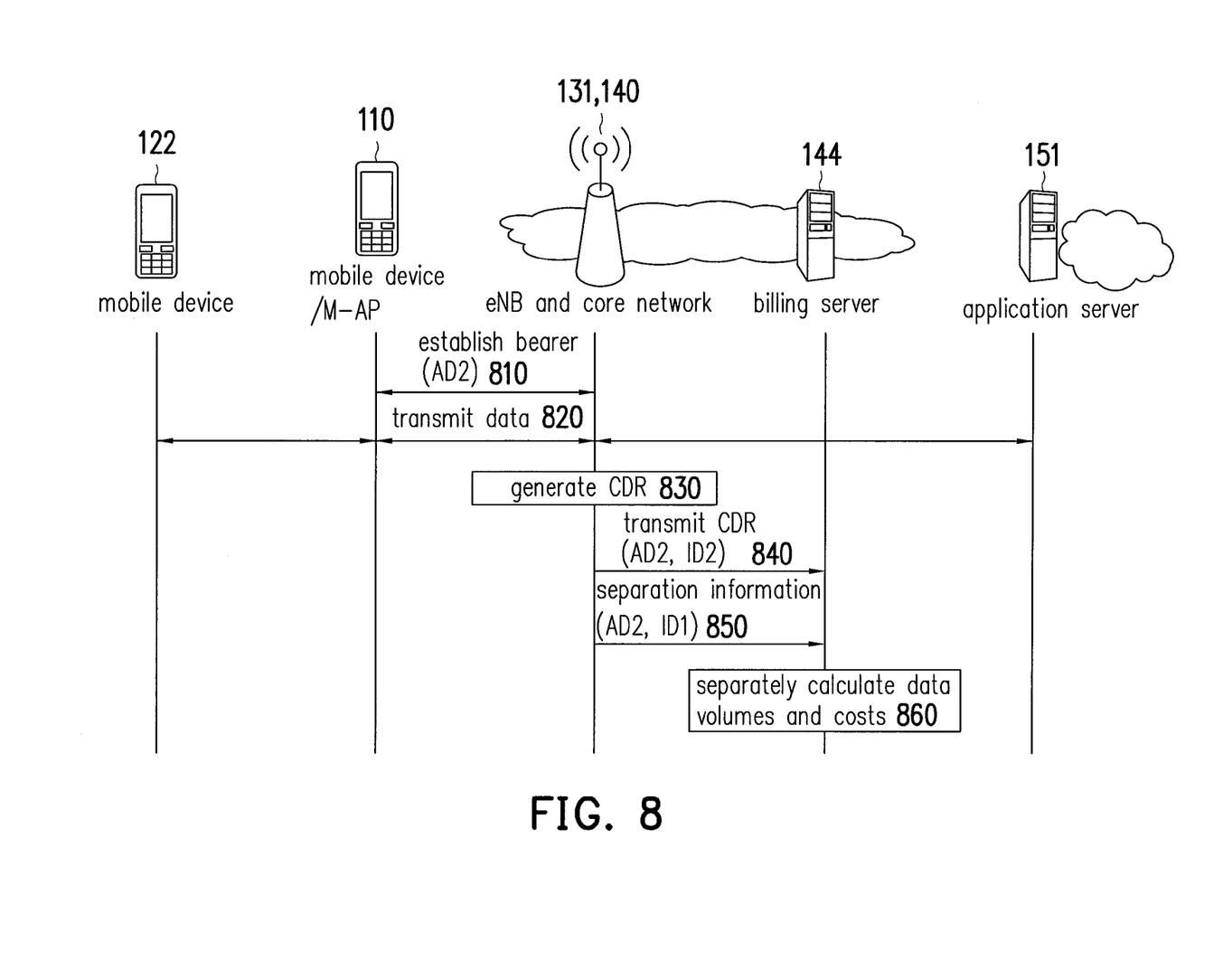

FIG. 8 illustrates a variation of the procedure of FIG. 7. Steps 810-820 of FIG. 8 are respectively the same as Steps 710-720 of FIG. 7 and thus will not be described again hereinafter. Then, in Step 830, the eNB 131 and the core network 140 generate the CDR of the access of the computer network 150 of the mobile access point 122. In Step 840, the eNB 131 and the core network 140 provide the CDR to the billing server 144. The CDR includes the network address AD2 and the identification code ID2 of the mobile device 122, and further includes the data volume and time duration of the access of the computer network 150 of the mobile device 122.

In Step 850, the ANDSF 143 provides the separation information to the billing server 144. The separation information indicates the binding relationship between the network address AD2 of the mobile device 122 and the mobile access point 110, that is, to indicate that the mobile device 122 accesses the computer network 150 via the mobile access point 110. The separation information includes the network address AD2 of the mobile device 122 and the identification code ID1 of the mobile access point 110. In Step 860, the billing server 144 can calculate data volumes and costs for the mobile access point 110 and the mobile device 122 separately according to the CDR and the separation information, and can also accurately accumulate the service provision volume of the mobile access point 110.

Figure 9:
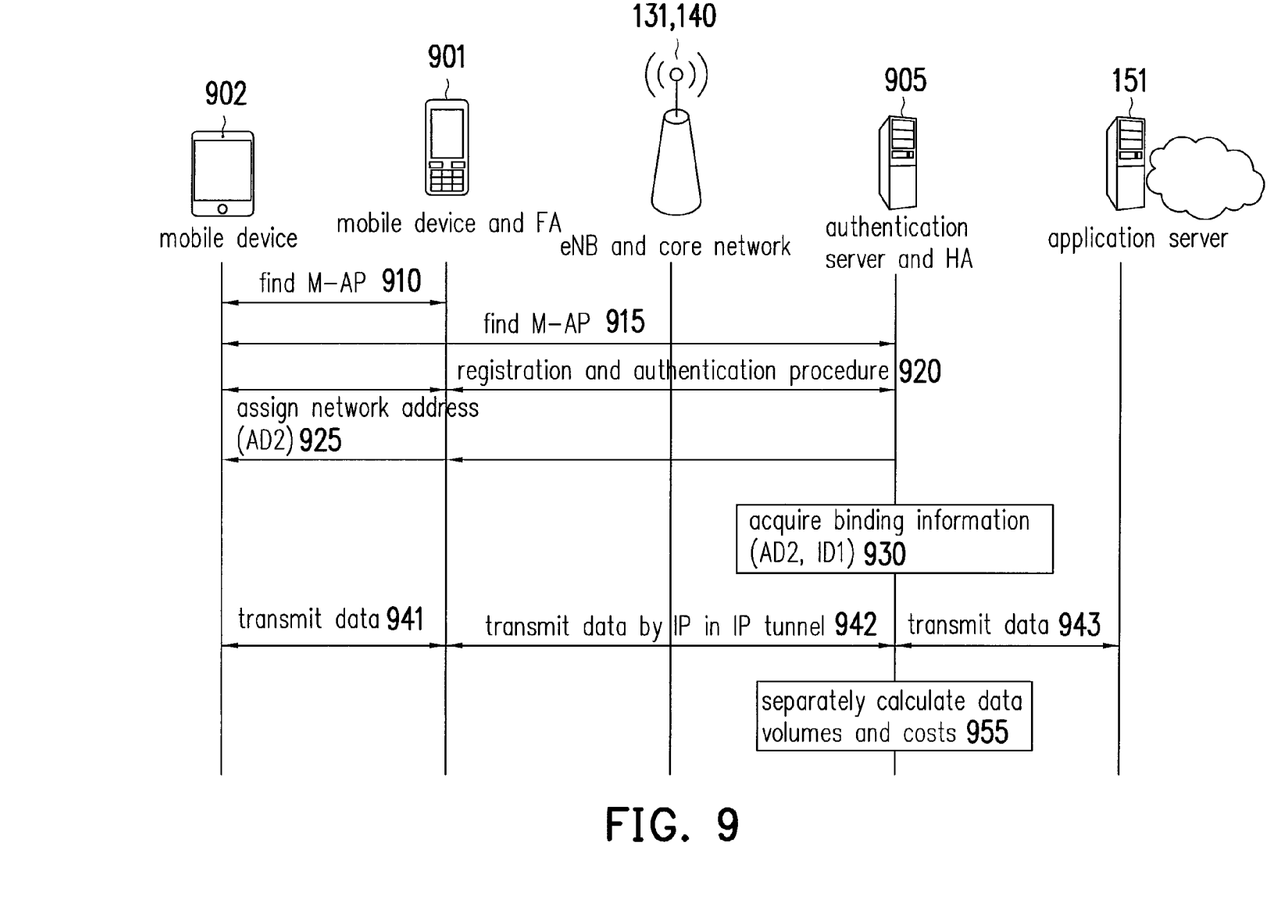

FIG. 9 is a flowchart illustrating a calculating method for calculating data volume of network access according to another embodiment of the disclosure. What this embodiment and the foregoing embodiments have in common is that a mobile device 901 operates as the mobile access point for a mobile device 902 to access the computer network 150 via at least one eNB and the core network 140, wherein the mobile device 901 has a function similar to a foreign agent (FA) in a Mobile Internet Protocol (Mobile IP, MIP) and is capable of executing tunnel encapsulation and decapsulation of IP in IP. The at least one eNB can be the eNB 131 (as the second application situation) or the eNBs 131 and 132 (as the third application situation). A difference between this embodiment and the foregoing embodiments is that this embodiment includes an additional authentication server 905 to replace the authentication server 142 and the billing server 144 in the foregoing embodiments. The authentication server 905 has a function similar to a home agent (HA) in the Mobile Internet Protocol (Mobile IP, MIP) and is capable of executing tunnel encapsulation and decapsulation of IP in IP and calculating packet data volume of the access of the computer network 150 of the mobile device 902. The authentication server 905 can be an independent server and can be located inside or outside the core network 140.

Figure 10:
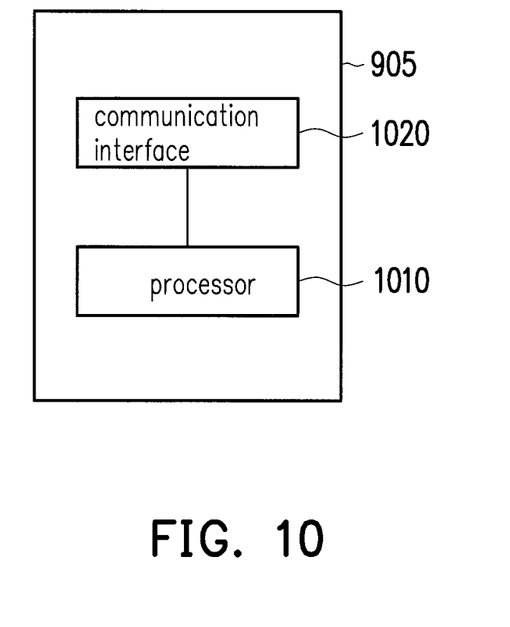
FIG. 10 is a schematic view of an authentication server according to an embodiment of the disclosure.

FIG. 10 is a schematic view of the authentication server 905 according to this embodiment of the disclosure. The authentication server 905 includes a processor 1010 and a communication interface 1020 that are coupled to each other. The communication interface 1020 is configured to communicate with the mobile access point 901 and the mobile device 902. The processor 1010 controls the authentication server 905 to execute the steps of the method of FIG. 9.

The steps of FIG. 9 are explained below. The mobile device 902 can find the mobile access point 901 in two ways. Step 910 is the first way, which is the same as Steps 305 and 310 of FIG. 3. Step 915 is the second way, which is the same as Steps 510-550 of FIG. 5 or Steps 610-640 of FIG. 6. In the case of the second way, the ANDSF 143 is replaced by the authentication server 905. Only one of Steps 910 and 915 needs to be executed.

Next, in Step 920, the authentication server 905 performs a registration and authentication procedure with the mobile device 902 via the mobile access point 901. The authentication server 905 assigns the network address AD2 to the mobile device 902 in Step 925. In Step 930, the authentication server 905 acquires binding information of the mobile access point 901 and the mobile device 902 according to the registration and authentication procedure, wherein the binding information indicates a binding relationship between the network address AD2 of the mobile device 902 and the identification code ID1 of the mobile access point 901, and this ID1 can be an IP address. In Steps 941, 942, and 943, the mobile device 902 and the application server 151 transmit data to each other via a tunnel of IP in IP. In Step 942, the mobile device 901 manages the IP in IP tunnel encapsulation of uplink packets and the IP in IP tunnel decapsulation of downlink packets. The authentication server 905 manages the IP in IP tunnel decapsulation of uplink packets and the IP in IP tunnel encapsulation of downlink packets, and in this procedure, calculates data volumes of network access of the mobile access point 901 and the mobile device 902 in Steps 941, 942, and 943 to generate a charging data record (CDR).

In Step 955, the authentication server 905 separately calculates data volumes and costs for the mobile access point 901 and the mobile device 902 according to the CDR and the binding information, and also can accurately accumulate the service provision volume of the mobile access point 901.

In this embodiment, the core network 140 is likely to calculate all the data volumes of network access of the mobile access point 901 and the mobile device 902 on the mobile access point 901; however, in that case, the user of the mobile access point 901 can be compensated according to the service provision volume accumulated by the authentication server 905.

In conclusion of the above, this disclosure is adapted for calculating data volumes separately for the core network in the situation that the mobile device accesses the network via the mobile access point. For the mobile device, the mechanism provided by this disclosure enables the mobile device to access the network via the nearby dual mode mobile device, so as to increase available network access points. The user of the mobile device does not need to know the user of the dual mode mobile device nor need to know where the dual mode mobile device is.

For the dual mode mobile device, this disclosure utilizes the local network access interface that is more efficient in power saving to access the network via another nearby dual mode mobile device, so as to save power and prolong the time of network access.

For the dual mode mobile device that provides the network access service, with the mechanism of this disclosure that calculates data volumes separately, the user of the dual mode mobile device is not required to bear the costs incurred by others and furthermore the service provision volume can be accurately accumulated for the user of the dual mode mobile device to earn rewards. Accordingly, the user of the dual mode mobile device will be more willing to provide the service of network access.

For the mobile service providers, the mechanism of this disclosure that automatically calculates data volumes separately increases the number of mobile access points, the number of network users, and operating income.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A calculating system for calculating data volume of network access, the calculating system comprising:
   at least one eNB coupled to a first mobile device and a second mobile device; and
   a core network coupled to the at least one eNB and a computer network and comprising a first server and a second server, wherein the first mobile device operates as a mobile access point (M-AP) for the second mobile device to access the computer network via the at least one eNB and the core network, the at least one eNB and the core network provide a charging data record (CDR) of access of the computer network of one of the first and second mobile devices to the second server, the first server provides to the second server separation information that indicates a binding relationship between a network address of the second mobile device and the other one of the first and second mobile devices, and the second server calculates data volumes of the access of the computer network of the first and second mobile devices separately according to the CDR and the separation information.

2. The calculating system according to claim 1, wherein the second server calculates costs incurred by the access of the computer network of the first and second mobile devices separately according to the CDR and the separation information.

3. The calculating system according to claim 1, wherein the second mobile device comprises a local access interface to communicate with the first mobile device, and the first mobile device comprises a local access interface to communicate with the second mobile device and further comprises a cellular interface to communicate with the at least one eNB.

4. The calculating system according to claim 1, wherein the core network further comprises a mobility management entity (MME), the first server provides to the MME binding information that indicates a binding relationship between the second mobile device and the first mobile device, and the MME accepts a request to establish a bearer for the second mobile device according to the binding information, wherein the bearer is exclusive resources that the core network assigns for connecting the second mobile device and the computer network.

5. The calculating system according to claim 1, wherein the first server is an authentication server, the second mobile device finds and connects to the first mobile device by an M-AP scan, the first server and the second mobile device perform an authentication procedure, and the first server assigns the network address to the second mobile device, wherein the CDR is the CDR of the first mobile device and comprises the network address of the second mobile device and an identification code of the first mobile device, and the separation information comprises the network address and an identification code of the second mobile device.

6. The calculating system according to claim 1, wherein the first server is an access network discovery and selection function server (ANDSF) and maintains an M-AP list and selects the first mobile device as the mobile access point of the second mobile device according to the M-AP list, and the M-AP list records local network information and position information of each mobile access point, wherein the position information is a position coordinate of the corresponding mobile access point or an identification code of the eNB that serves the corresponding mobile access point.

7. The calculating system according to claim 6, wherein the core network assigns the network address to the second mobile device in an attach procedure of the second mobile device.

8. The calculating system according to claim 6, wherein the first server provides to the second mobile device a local M-AP scan list according to the position information provided by the second mobile device and receives a scan report from the second mobile device, the scan report comprises a scan result of the second mobile device scanning at least one mobile access point in the local M-AP scan list, and the first server selects one of the mobile access points in the scan report as the first mobile device and sends a local connection request to the first mobile device for the second mobile device.

9. The calculating system according to claim 6, wherein the second mobile device performs an M-AP scan to provide a scan report to the first server, the scan report comprises a scan result of the second mobile device scanning at least one mobile access point, and the first server selects one of the mobile access points in the scan report as the first mobile device and sends a local connection request to the first mobile device for the second mobile device.

10. The calculating system according to claim 6, wherein the CDR is the CDR of the first mobile device and comprises the network address of the second mobile device and an identification code of the first mobile device, and the separation information comprises the network address and an identification code of the second mobile device.

11. The calculating system according to claim 6, wherein the CDR is the CDR of the second mobile device and comprises the network address of the second mobile device and an identification code of the second mobile device, and the separation information comprises a network address and an identification code of the first mobile device.

12. An authentication server, comprising:
a communication interface adapted for communicating with a first mobile device and a second mobile device, wherein the first mobile device operates as a mobile access point (M-AP) for the second mobile device to access a computer network via at least one eNB, a core network, and the authentication server; and
a processor coupled to the communication interface and performing a registration and authentication procedure via the first mobile device with the second mobile device and acquiring binding information according to the registration and authentication procedure, wherein the binding information indicates a binding relationship between the second mobile device and the first mobile device, and wherein the processor generates a charging data record (CDR) of access of the computer network of the first and second mobile devices and separately calculates data volumes of the access of the computer network of the first and second mobile devices according to the CDR and the binding information.

13. The authentication server according to claim 12, wherein the processor maintains an M-AP list and selects the first mobile device as the mobile access point of the second mobile device according to the M-AP list, and the M-AP list records local network information and position information of each mobile access point, wherein the position information is a position coordinate of the corresponding mobile access point or an identification code of the eNB that serves the corresponding mobile access point.

14. The authentication server according to claim 13, wherein the processor provides to the second mobile device a local M-AP scan list according to the position information provided by the second mobile device and receives a scan report from the second mobile device, the scan report comprises a scan result of the second mobile device scanning at least one mobile access point in the local M-AP scan list, and the processor selects one of the mobile access points in the scan report as the first mobile device.

15. The authentication server according to claim 13, wherein the processor receives a scan report generated by an M-AP scan performed by the second mobile device, the scan report comprises a scan result of the second mobile device scanning at least one mobile access point, and the processor selects one of the mobile access points in the scan report as the first mobile device.

16. The authentication server according to claim 12, wherein the processor assigns a network address to the second mobile device after the registration and authentication procedure, and calculates costs incurred by the access of the computer network of the first and second mobile devices separately according to the CDR and the binding information.

17. The authentication server according to claim 16, wherein the second mobile device and the computer network transmit data to each other via an Internet Protocol (IP) in IP tunnel between the first mobile device and the authentication server, and the processor performs an IP in IP tunnel decapsulation of an uplink packet and an IP in IP tunnel encapsulation of a downlink packet.

18. The authentication server according to claim 17, wherein the first mobile device performs the IP in IP tunnel encapsulation of the uplink packet and the IP in IP tunnel decapsulation of the downlink packet.

19. A calculating method for calculating data volume of network access, the calculating method comprising:
providing a charging data record (CDR) of access of a computer network of one of a first mobile device and a second mobile device, wherein the first mobile device operates as a mobile access point (M-AP) for the second mobile device to access the computer network via at least one eNB and a core network;
providing separation information, wherein the separation information indicates a binding relationship between a network address of the second mobile device and the other one of the first and second mobile devices; and
calculating data volumes of the access of the computer network of the first and second mobile devices separately according to the CDR and the separation information.

20. The calculating method according to claim 19, further comprising:
calculating costs incurred by the access of the computer network of the first and second mobile devices separately according to the CDR and the separation information.

21. The calculating method according to claim 19, further comprising:
providing binding information that indicates a binding relationship between the second mobile device and the first mobile device; and
accepting a request to establish a bearer for the second mobile device according to the binding information, wherein the bearer is exclusive resources that the core network assigns for connecting the second mobile device and the computer network.

22. The calculating method according to claim 19, further comprising:
performing an authentication procedure with the second mobile device, and assigning the network address to the second mobile device, wherein the CDR is the CDR of the first mobile device and comprises the network address of the second mobile device and an identification code of the first mobile device, and the separation information comprises the network address and an identification code of the second mobile device.

23. The calculating method according to claim 19, further comprising:
maintaining an M-AP list; and
selecting the first mobile device as the mobile access point of the second mobile device according to the M-AP list, wherein the M-AP list records local network information and position information of each mobile access point, and the position information is a position coordinate of the corresponding mobile access point or an identification code of the eNB that serves the corresponding mobile access point.

24. The calculating method according to claim 23, further comprising:
assigning the network address to the second mobile device in an attach procedure of the second mobile device.

25. The calculating method according to claim 23, further comprising:
providing to the second mobile device a local M-AP scan list according to the position information provided by the second mobile device;
receiving a scan report from the second mobile device, wherein the scan report comprises a scan result of the second mobile device scanning at least one mobile access point in the local M-AP scan list;
selecting one of the mobile access points in the scan report as the first mobile device; and
sending a local connection request to the first mobile device for the second mobile device.

26. The calculating method according to claim 23, further comprising:
receiving a scan report generated by an M-AP scan performed by the second mobile device, wherein the scan report comprises a scan result of the second mobile device scanning at least one mobile access point; and
selecting one of the mobile access points in the scan report as the first mobile device; and
sending a local connection request to the first mobile device for the second mobile device.

27. The calculating method according to claim 23, wherein the CDR is the CDR of the first mobile device and comprises the network address of the second mobile device and an identification code of the first mobile device, and the separation information comprises the network address and an identification code of the second mobile device.

28. The calculating method according to claim 23, wherein the CDR is the CDR of the second mobile device and comprises the network address of the second mobile device and an identification code of the second mobile device, and the separation information comprises a network address and an identification code of the first mobile device.

29. A calculating method for calculating data volume of network access, executed by an authentication server, the calculating method comprising:
performing a registration and authentication procedure via a first mobile device with a second mobile device, wherein the first mobile device operates as a mobile access point (M-AP) for the second mobile device to access a computer network via at least one eNB and a core network;
acquiring binding information according to the registration and authentication procedure, wherein the binding information indicates a binding relationship between the second mobile device and the first mobile device;
generating a charging data record (CDR) of access of the computer network of the first and second mobile devices; and
separately calculating data volumes of the access of the computer network of the first and second mobile devices according to the CDR and the binding information.

30. The calculating method according to claim 29, further comprising:
maintaining an M-AP list; and
selecting the first mobile device as the mobile access point of the second mobile device according to the M-AP list, wherein the M-AP list records local network information and position information of each mobile access point, and the position information is a position coordinate of the corresponding mobile access point or an identification code of the eNB that serves the corresponding mobile access point.

31. The calculating method according to claim 30, further comprising:
providing to the second mobile device a local M-AP scan list according to the position information provided by the second mobile device;
receiving a scan report from the second mobile device, wherein the scan report comprises a scan result of the second mobile device scanning at least one mobile access point in the local M-AP scan list; and
selecting one of the mobile access points in the scan report as the first mobile device.

32. The calculating method according to claim 30, further comprising:
receiving a scan report generated by an M-AP scan performed by the second mobile device, wherein the scan report comprises a scan result of the second mobile device scanning at least one mobile access point; and
selecting one of the mobile access points in the scan report as the first mobile device.

33. The calculating method according to claim 29, further comprising:
assigning a network address to the second mobile device after the registration and authentication procedure; and
calculating costs incurred by the access of the computer network of the first and second mobile devices separately according to the CDR and the binding information.

34. The calculating method according to claim 33, wherein the second mobile device and the computer network transmit data to each other via an Internet Protocol (IP) in IP tunnel between the first mobile device and the authentication server, and the calculating method further comprises:

performing an IP in IP tunnel decapsulation of an uplink packet and an IP in IP tunnel encapsulation of a downlink packet.

35. The calculating method according to claim 34, wherein the first mobile device performs the IP in IP tunnel encapsulation of the uplink packet and the IP in IP tunnel decapsulation of the downlink packet.

\* \* \* \* \*